United States Patent
Weberg et al.

(10) Patent No.: US 8,858,850 B2
(45) Date of Patent: Oct. 14, 2014

(54) PROCESS FOR PREPARING DECORATIVE SURFACE APPEARANCE IN ACRYLIC MATERIAL EMPLOYING ANISOTROPIC PARTICLES

(75) Inventors: Rolf Thomas Weberg, East Auroa, NY (US); Marc Koester, Buffalo, NY (US); Marie Neiss, North Tonawanda, NY (US)

(73) Assignee: E I du Pont de Nemours and Company, Wilmington, DE (US)

( * ) Notice: Subject to any disclaimer, the term of this patent is extended or adjusted under 35 U.S.C. 154(b) by 378 days.

(21) Appl. No.: 12/818,473

(22) Filed: Jun. 18, 2010

(65) Prior Publication Data

US 2011/0143036 A1 Jun. 16, 2011

Related U.S. Application Data

(60) Provisional application No. 61/222,582, filed on Jul. 2, 2009.

(51) Int. Cl.
| | |
|---|---|
| *B29C 41/02* | (2006.01) |
| *B29C 33/42* | (2006.01) |
| *B29C 39/00* | (2006.01) |
| *B29C 41/36* | (2006.01) |
| *B44C 1/00* | (2006.01) |
| *B29C 41/00* | (2006.01) |
| *B29K 33/00* | (2006.01) |
| *B29C 37/00* | (2006.01) |

(52) U.S. Cl.
CPC ....... *B29C 41/003* (2013.01); *B29K 2995/0021* (2013.01); *B29C 33/424* (2013.01); *B29K 2033/08* (2013.01); *B29C 39/006* (2013.01); *B29C 41/36* (2013.01); *B44C 1/005* (2013.01); *B29C 37/0053* (2013.01)
USPC ....... 264/171.13; 427/275; 427/276; 264/212

(58) Field of Classification Search
USPC ............... 264/212, 171.13; 427/275, 276
See application file for complete search history.

(56) References Cited

U.S. PATENT DOCUMENTS

| | | | | |
|---|---|---|---|---|
| 3,488,246 | A * | 1/1970 | Duggins | 428/15 |
| 4,892,700 | A * | 1/1990 | Guerra et al. | 264/510 |
| 6,203,911 | B1 | 3/2001 | Weberg et al. | |
| 6,476,111 | B1 | 11/2002 | Beauchemin et al. | |
| 6,702,967 | B2 * | 3/2004 | Overholt et al. | 264/77 |

FOREIGN PATENT DOCUMENTS

| | | |
|---|---|---|
| WO | WO 2005/035243 | 4/2005 |
| WO | WO 2007/050756 | 5/2007 |
| WO | WO 2007050756 A2 * | 5/2007 |

* cited by examiner

*Primary Examiner* — Galen Hauth

(57) ABSTRACT

A decorative surface appearance in an acrylic material is obtained by applying a flowable crosslinkable acrylic material containing anisotropic particles having an aspect ratio of 3 to a shrinkable support followed by crosslinking to form a solid article.

5 Claims, No Drawings

PROCESS FOR PREPARING DECORATIVE SURFACE APPEARANCE IN ACRYLIC MATERIAL EMPLOYING ANISOTROPIC PARTICLES

BACKGROUND OF THE INVENTION

1. Field of the Invention

This invention relates to process of preparing a decorative surface pattern in an acrylic polymer composition employing anisotropic particles.

2. Description of the Related Art

Solid surface materials which contain an acrylic polymer composition are known in the prior art. Also it is known for the acrylic polymer compositions to contain anisotropic particles which allow different visual appearances due to different orientations of the anisotropic particles.

U.S. Pat. No. 6,203,911 discloses an acrylic molding composition which contains an acrylic molding composition with two different thermal initiators.

U.S. Pat. No. 6,476,111 discloses an acrylic containing composition which contains a semi-crystalline polymer such as a polyester.

U.S. Pat. No. 6,702,967 discloses formation of a decorative pattern in an acrylic material employing anisotropic particles.

A need is present for a new process to create a decorative surface pattern in an acrylic polymer composition.

SUMMARY OF INVENTION

This invention is directed to a process for preparing a decorative surface appearance in an acrylic material comprising the steps of
(a) forming a liquid composition containing a crosslinkable acrylic material and anisotropic particles with a majority of the anisotropic particles having an aspect ratio of at least three,
(b) applying the liquid composition to a support which has the ability to shrink at least 1 percent.
(c) solidifying the liquid composition to form a solid article.

DETAILED DESCRIPTION OF THE INVENTION

A detailed description of the invention is initially set forth in several parts, including Part I directed to starting materials which result in the final solid article and Part II directed to a process of producing the final solid article.

Part I—Suitable Starting Materials

Acrylic Materials

Suitable acrylic materials include acrylic group monomers, acrylic group partial polymers as well as vinyl monomers for copolymerization other than acrylic group monomers. A preferred monomer is methyl methacrylate (MMA) and a preferred polymer is poly(methyl methacrylate). The acrylic containing material is a liquid capable of crosslinking to form a solid article.

Other monomers useful as polymerizable constituents are alkyl acrylates and methacrylates including an alkyl groups from 1-18 carbon atoms, preferably 1-4 carbon atoms. Suitable acrylic monomers are methyl acrylate; ethyl acrylate and methacrylate; n-propyl and i-propyl acrylates and methacrylates; n-butyl, 2-butyl, i-butyl and t-butyl acrylates and methacrylates; 2-ethylhexyl acrylate and methacrylate; cyclohexyl acrylate and methacrylate; omega-hydroxyalkyl acrylates and methacrylates; N,N-dialkylaminoalkyl acrylates and methacrylates; N-[t-butyl]aminoethyl acrylate and methacrylate.

Other unsaturated monomers can be included with the acrylic material and illustratively include: styrene; bis-[beta-chloroethyl] vinylphosphonate; vinyl acetate; α-methylenebutyrolactone (MBL); acrylonitrile; methacrylonitrile; acrylic and methacrylic acids; 2-vinyl- and 4-vinyl pyridines; maleic acid, maleic anhydride and esters of maleic acid; acryl amide and methacrylamide; itaconic acid, itaconic anhydride and esters of itaconic acid and multifunctional monomers for cross-linking purposes such as unsaturated polyesters: alkylene diacrylates and dimethacrylates; allyl acrylate and methacrylate; N-hydroxymethylacrylamide and N-hydroxymethylmethacryl-amide; N,N'-methylene diacrylamide and dimethacrylamide; glycidyl acrylate and methacrylate; diallyl phthalate; divinylbenzene; divinyltoluene; trimethylolpropane, triacrylate and trimethacrylate; pentaerythritol tetraacrylate and tetramethacrylate; triallyl citrate and triallyl cyanurate.

Anisotropic Particles

A required constituent of the starting formulation employed in the process process are anisotropic particles. Anisotropic is employed in its normal meaning and denotes an ability to exhibit properties with different values when measured along axis in different directions. For purposes of the present invention, different values are specific to different visual appearances of a particle. The same particle will have different appearances to an observer dependent on the angle which the observer views the particle. With many anisotropic particles in a composition used in the present process, there will be a degree of randomness in orientation of the particles in the final solid article which leads to a pleasing visual effect.

A requirement of anisotropic particles used herein is at least a majority of the anisotropic particles have an aspect ratio of at least 3. Aspect ratio means the largest dimension of the particle (conventionally referred to as length or width) compared to the smallest dimension not in the same axis or plane (conventionally referred to as thickness). A group of particles which fall within this definition have a plate-like appearance which can be considered to have two dimensions greater than a third dimension. It is understood that fibers and ribbons are within the scope of particle.

Generally there is no upper limit for the aspect ratio of the anisotropic particles. However for some applications a majority of the anisotropic particles will not have an aspect ratio greater than 70.

Aspect ratios of suitable anisotropic particles may cover a broad range, e.g. aluminum flakes (20-100), mica (10-70), milled glass fiber (3-25), aramid fiber (100-500), chopped carbon fiber (800), chopped glass fiber (250-800) and milled coated carbon fiber (200-1600). These visual effects may be due to angle dependent reflectivity, angle dependent color absorption/reflection, or visible shape. These particles may be plate-like, fibers, or ribbons. Plate-like materials have two dimensions significantly larger than the third dimension. Examples of plate-like materials include mica, synthetic mica, glass flakes, metal flakes, alumina and silica substrates, polymer film flakes, as well as synthetic materials such as ultra-thin, multi-layer interference flakes (e.g., Chromaflair® from Flex Products), and helical superstructure, cigar-shaped liquid crystal molecules (e.g., Helicone® HC from Wacker). Preferred particles are metal flake, and mica.

Additives

The formulation containing the acrylic material and anisotropic particles may contain other additives which are well known in the art.

A commonly employed additive is solid surface particulate used as aesthetic fillers. Known to the industry as "crunchies", they are various filled and unfilled, pigmented or dyed, insoluble or crosslinked chips of polymers such as ABS resins, cellulose esters, cellulose ethers, epoxy resins, polyethylene, ethylene copolymers, melamine resins, phenolic resins, polyacetals, polyacrylics, polydienes, polyesters, polyisobutylenes, polypropylenes, polystyrenes, urea/formaldehyde resins, polyureas, polyurethanes, polyvinyl chloride, polyvinylidene chloride, polyvinyl esters and the like.

A class of additives includes materials which impart flame resistance to the final solid article such as alumina trihydrate (ATH). Examples of other materials include colorants, fillers, sizing agents, impact modifiers, marring agent retarders, UV stabilizers and other materials which affect the properties of the solid article.

Generally the viscosity of the starting acrylic material with anisotropic particles and all additives can be within a wide range such as 800-4000 cp, and more preferably 1000-2000 cp. A degree of flow of starting material is needed since as set forth in a theory below a degree of reorientation of anisotropic particles occurs.

Solidification

The acrylic material used as the starting material is thermosetting and solidification with crosslinking can be carried out by either of two ways namely a thermal cure employing heat to cause crosslinking or by a chemical cure such as by use of a peroxide. Both methods to obtain crosslinking are well known in the prior art.

Part II—Process of Preparation

Support Surface

A critical requirement of the present invention is the type of support for the starting acrylic material with anisotropic particles as the acrylic material changes from a liquid phase to a solid phase due to crosslinking.

The critical requirement is the support material is an ability to shrink at elevated temperature. A numerical value for shrinkage of the support material can be expressed on the surface area of the material at a temperature of 25 degrees centigrade compared to the surface area of the material at a temperature of 100 degrees Centigrade (both measurements with the support material maintained at these temperatures for a period of 30 minutes).

It is required that this shrinkage of the support material be at least 1 percent and more preferably 5 to 15% For purposes of illustration if an area of the support material at 25 degrees Centigrade is 100 square centimeters and the area of the same contact material at 100 degrees Centigrade is 99 square centimeters, the shrinkage will be 1 percent.

Suitable support materials include two criteria, namely (1) an ability to shrink at least 1 percent and an ability to withstand a temperature of 100 degrees centigrade for continued support (and a higher temperature if employed to cause crosslinking of the acrylic formulation).

Examples of suitable contact materials include polymer films such as polyethylene (PE), polypropylene (PP), Nylon, polyvinyl fluoride (PVF) such as Tedlar®, and polyethylene terephthalate (PET).

It is understood that different visual effects of the solid article can be obtained based on (1) shrinkage of the support material and (2) shrinkage of the acrylic material containing anisotropic particles.

Two different shrinkages take place during manufacture of the final solid article. A first shrinkage occurs in the support material due to transfer of heat from the acrylic material in the crosslinking. This transfer of heat occurs both in a chemical cure and a thermal cure. A second shrinkage occurs as the volume of the acrylic formulation decreases in a phase change from liquid to solid. The difference in shrinkage between a support material and an acrylic material imparts a distinct visual appearance due to different orientations of the anisotropic particles.

It is understood that different visual appearances in a final solid article can be obtained employing the same support material and the same acrylic material with anisotropic particles. Illustratively in a first example, an acrylic material with anisotropic particles can be cast onto the shrinkable support material to form a final solid article having a thickness of ¼ inch (6.35 mm). A second example is the acrylic material with the anisotropic particles is cast onto the shrinkable support into an solid article having a thickness of 2 inches (50.8 mm) (which means a thickness 8 times greater). A difference in shrinkage is present in the two examples due to sample thickness which directly accounts for a different visual appearance.

Also a visual appearance of an acrylic material with anisotropic particles can change due to the manner of application to a shrinkable support material. In a continuous process wherein the support material is present on a moving belt, a similar orientation of anisotropic particles can occur due to the constant flow of the acrylic material. An example of a continuous process is manufacture of a sheet of material which is cut for use such as in kitchen countertops. A different effect with less orientation of anisotropic particles can occur in a batch process as in manufacture of a kitchen sink.

However it is considered useful in some situations to provide a correlation between shrinkage of the support material and the shrinkage of the acrylic formulation with all components including the anisotropic particles. (Shrinkage of the acrylic formulation with all components is based on volume before crosslinking to volume after solidification. Illustratively if an initial volume is 100 cubic centimeters and the final solid volume is 99 cubic centimeters, the shrinkage is 1 percent).

For purposes of illustration a numerical difference between shrinkage of a support material (expressed in area) compared to a shrinkage of an acrylic formulation with all components (expressed in volume) is at least 0.1%, preferably greater than 1.0%. Illustratively, if the support material shrinks 1 percent and the acrylic formulation with all components shrinks 8 percent, the numerical difference is 7. Generally the acrylic formulation with all components will shrink more than the support material; however it is within the scope of the present invention to employ a highly shrinkable support which shrinks more than the acrylic material.

However there can be only a small or no numerical difference in the final crosslinked solid article in accordance with the description of the previous paragraph and still obtain differential shrinkage at an interface between the support material and the acrylic formulation with all additives. The differential shrinkage may occur at any time after the starting acrylic material with anisotropic particles comes into contact with the support surface. It is not required that the differential shrinkage remain after the starting acrylic material with anisotropic particles has crosslinked into a cured solid article. The interface area can vary significantly dependent on the thickness of the final solid acrylic article.

Theory to Support Difference in Visual Appearance

The following section is provided as a theory to support reasons why the process set forth herein leads different visual appearances.

If a shrinkage support is not used, a degree of orientation can be present for anisotropic particles in a continuous process such as an acrylic material with all additives being applied to a moving belt. The same degree of orientation of anisotropic particles may not be present in a batch process such as with use of a mold.

In the present invention shrinkage is present in two different materials at an interface between a support material and shrinkage in an acrylic material with anisotropic particles. This shrinkage of the two different materials continues at elevated temperature (whether chemical or thermal crosslinking is employed).

It is considered that due to shrinkage of the two different materials at an interface, a degree of reorientation of the anisotropic particles take place as the liquid acrylic material crosslinks to form a solid article. It is the reorientation of the anisotropic particles during curing and solidification of the acrylic material which accounts for a change in visual appearance.

Additionally the present theory is considered to provide a basis that a greater change in visual appearance occurs due to a larger numerical difference in shrinkage between two different materials at an interface. This change of appearance is based on a greater degree of reorientation of anisotropic particles. Accordingly the present theory is believed to support a position that a greater change in appearance can take place in a solid material made by a continuous process compared to a batch process. As set forth above, a greater initial orientation of orientation of anisotropic particles can take place in a continuous process and shrinkage at an interface causes reorientation.

Manufacturing

The manufacture of the final solid article can be undertaken in a conventional manner with the exception of use of a shrinkable support. The acrylic material with anisotropic particles with all other additives is formed into a formulation and applied to a support such as on a moving belt or within a mold. Solidification occurs due to crosslinking of the acrylic material.

Due to use of a shrinkage support, surface removal such as by sanding of the solidified material is typically necessary. Due to the effect to two shrinkages occurring as the solid article is formed, a greater degree of surface smoothness may be needed.

In the following examples, all parts and percentages are by weight, and degrees in centigrade, unless otherwise indicated.

EXAMPLES

Example 1

Metallic Formulation on PVA Film for Uniform Metallic Look

This example describes the preparation of a decorative surfacing material that contains a reflective, anisotropic, high aspect ratio aluminum flake pigment and alumina trihydrate as a mineral filler.

Formulation Makeup

The formulation was comprised of a base mixture and a final cure package as follows.

Base Mixture:
  590 grams ATH (alumina trihydrate) from Alcan
  33.33 grams 9Z1351 (aluminum flake pigment dispersion in IBOMA) from Penn Color Inc.
  53.10 grams Methyl methacrylate (MMA)
  299.74 grams SIRUP (pre-polymerized Methyl methacrylate)
  11.02 grams tert-Butylperoxymaleic acid (PMA-25) initiator paste from Arkema
  4.24 grams Trimethylolpropane trimethacrylate (TRIM or SR350AA) cross-linker from Sartomer
  0.65 grams Zelec® PH coupling agent from Stepan
  1.56 grams AOT-S (Aerosol OT-S) surfactant from Cytec Final Cure Package Ingredients:
  4.4 grams calcium hydroxide (Ca(OH)2) dispersion from DuPont
  0.14 grams of de-ionized water
  1.73 grams of Glycol Dimercaptoacetate (GDMA) from Evans Chemetics Liquid Mix Preparation A liquid mix was prepared by combining the MMA, SIRUP, PMA-25, AOT-S, TRIM, Zelec PH, and 9Z1351 in a small vessel. An impeller driven by an air motor was used to mix the components for 2 minutes. The ATH was added and mixing was continued for 30 seconds at a speed of 1200 to 1400 rpm. The entire mixture was placed in an evacuator apparatus and stirred with an impeller driven by an air motor (500 rpm) at a reduced pressure of 24 inches of mercury. The final cure package ingredients (calcium hydroxide, water, and GDMA) were added by syringe to the mix 80 seconds after the vacuum was reached. After an additional 40 seconds (120 seconds total), the mixer was stopped and the vacuum was released. The initiated mix was poured into the casting cavity immediately.

Preparation of Casting Cavity

An 8"×8"×0.5" casting cavity was lined with PVA film and held in place by vacuum. The casting cavity was preheated to 35 degrees C.

Casting and Finishing

The evacuated mix was poured into the casting cavity and covered with a polyester film sheet. An insulating cover was placed on top of the polyester film to minimize heat loss of the curing material.

After the mix was allowed to cure to a peak temperature and then cool to room temperature, the resulting solid surface sample was taken out of the casting cavity.

Light sanding revealed a surface that was representative of the bulk of the material. The sample can be described as a uniform silver metallic material without an obvious visual texture.

Example 2

Metallic Formulation on PVA Film over a Topographical Surface

The formulation described in Example 1 was prepared. Prior to casting, a pre-cured filled polymer material in the topographic shape of overlapping strings approximately 1/16" in diameter was placed underneath the PVA casting film in the preheated casting cavity. The curing mix was poured into the casting cavity now having a topographic casting surface and allowed to cure. After removal of the film, the resulting cast material exhibited a surface groove pattern mirroring the topographic casting surface. Upon sanding of the cast surface to remove the cast grooves and provide a flat, finished surface, a pattern of reflective gradients arranged similar to the topographic casting surface pattern was observed. This reflective gradient pattern exhibited a unique three dimensional character.

Example 3

Metallic Formulation on Polypropylene (PP) Film Over a Topographical Surface

The formulation described in Example 1 was prepared. Prior to casting, a pre-cured filled polymer material in the topographic shape of overlapping strings approximately 1/16" in diameter was placed underneath a biaxially oriented, extruded polypropylene casting film lining the preheated casting cavity. The curing mix was poured into the casting cavity now having a topographic casting surface and allowed to cure. After removal of the film, the resulting cast material exhibited a surface groove pattern mirroring the topographic casting surface as well as additional grooves resulting from shrinkage of the polypropylene film. Upon sanding of the material surface to remove the cast grooves and provide a flat, finished surface, a complex reflective gradient pattern based upon a combination of the topographic casting surface pattern and the film wrinkle pattern was observed. This reflective gradient pattern exhibited a unique three dimensional character, more complex than that observed in Example 2.

Example 4

Metallic Formulation on Polypropylene (PP) Film

The formulation described in Example 1 was prepared. Prior to casting, the preheated casting cavity was lined with a biaxially oriented, extruded polypropylene casting film. The curing mix was poured into the casting cavity and allowed to cure. After removal of the film, the resulting cast material exhibited a surface groove pattern resulting from random, uncontrolled shrinkage of the polypropylene film. Upon sanding of the material surface to remove the cast grooves and provide a flat, finished surface, a complex reflective gradient pattern based upon the film wrinkle pattern was observed. This reflective gradient pattern exhibited a unique three dimensional character.

Example 5

Metallic Formulation on Polypropylene (PP) Film & Paper/Underlayment

The formulation described in Example 1 was prepared. Prior to casting, an embossed paper underlayment having a repeating 1" hexagonal perforation pattern, was placed underneath a biaxially oriented, extruded polypropylene casting film lining the preheated casting cavity. The curing mix was poured into the casting cavity and allowed to cure. After removal of the film, the resulting cast material exhibited a surface groove pattern mirroring the paper perforation pattern. Upon sanding of the material surface to remove the cast grooves and provide a flat, finished surface, a complex reflective gradient pattern based upon the embossed paper pattern was observed. This reflective gradient pattern exhibited a unique, three dimensional character.

Example 6

Metallic Formulation with Solid Surface Particulate on PVA Film

This example describes the preparation of a decorative surfacing material that contains a reflective, anisotropic, high aspect ratio aluminum flake pigment, solid surface particulate as aesthetic filler, and alumina trihydrate as a mineral filler.
Liquid Formulation Makeup
The liquid formulation consists of a base mixture and a final cure package as follows.
Base Mixture:
  430 grams ATH (alumina trihydrate) from Alcan
  250 grams of CORIAN® 4×12 mesh size particulate
  33.33 grams 9Z1351 (aluminum flake pigment dispersion in IBOMA) from
Penn Color Inc.
  69.21 grams Methyl methacrylate (MMA)
  200.00 grams SIRUP (pre-polymerized Methyl methacrylate)
  8.59 grams tert-Butylperoxymaleic acid (PMA-25) initiator paste from Arkema
  2.55 grams Trimethylolpropane trimethacrylate (TRIM or SR350AA) cross-linker from Sartomer
  0.64 grams Zelec® PH coupling agent from Stepan
  1.56 grams AOT-S (Aerosol OT-S) surfactant from Cytec
Final Cure Package Ingredients:
  2.66 grams calcium hydroxide (Ca(OH)2) dispersion from DuPont
  0.11 grams of de-ionized water
  1.35 grams of Glycol Dimercaptoacetate (GDMA) from Evans Chemetics
Liquid Formulation Preparation:
  A liquid formulation was prepared at room temperature by combining the MMA, SIRUP, PMA-25, AOT-S, TRIM, Zelec PH, and 9Z1351 in a small vessel. An impeller driven by an air motor was used to mix the components for 2 minutes. The ATH and CORIAN® particulate were added and mixing was continued for 30 seconds at a speed of 1200 to 1400 rpm. The entire mixture was placed in an evacuator apparatus and stirred with an impeller driven by an air motor (500 rpm) at a reduced pressure of 24 inches of mercury. The final cure package ingredients (calcium hydroxide, water, and GDMA) were added by syringe to the mix 80 seconds after the vacuum was reached. After an additional 40 seconds (120 seconds total), the mixer was stopped and the vacuum was released. The initiated mix was poured into the casting cavity immediately.
Preparation of Casting Cavity
  An 8"×8"×0.5" casting cavity was lined with PVA film and held in place by vacuum. The casting cavity was preheated to 35 degrees C.
Casting and Finishing
  The evacuated mix was poured into the casting cavity and covered with a polyester film sheet. An insulating cover was placed on top of the polyester film to minimize heat loss of the curing material.
  After the mix was allowed to cure to a peak temperature and then cool to room temperature, the resulting solid surface sample was taken out of the casting cavity.
  Upon sanding of the cast surface to expose the solid surface particulate, a pattern of reflective gradients arranged around the large CORIAN® particulates was observed. This reflective gradient pattern exhibited a unique three dimensional halo surrounding the large particulates.

What is claimed is:
1. A process for preparing a decorative surface appearance in a decorative acrylic material comprising the steps of
  (a) forming a liquid composition containing a crosslinkable acrylic material and anisotropic particles with a majority of the anisotropic particles having an aspect ratio of at least three,
  (b) applying the liquid composition to a shrinkable support,
  (c) solidifying the liquid composition by crosslinking while allowing the support to shrink, to form a solid article wherein the difference between the shrinkage of the support compared to the shrinkage of liquid composition is at least 0.1%.

2. The process of claim 1 wherein the support consists of a polymer film selected from the group of polyethylene, polypropylene, nylon, polyvinyl fluoride, and polyethylene terephthalate.

3. The process of claim 2 wherein the anisotropic particles are metal flake.

4. The process of claim 3 wherein the liquid composition further comprises chips of polymers used as aesthetic filler.

5. The process of claim 1 wherein the difference between the shrinkage of the support compared to the shrinkage of liquid composition is in a range from 5 to 15%.

\* \* \* \* \*